US011970379B2

United States Patent

(12) United States Patent
Akita et al.

(10) Patent No.: US 11,970,379 B2
(45) Date of Patent: Apr. 30, 2024

(54) CARGO-HANDLING VEHICLE

(71) Applicant: Mitsubishi Logisnext Co., Ltd., Nagaokakyo (JP)

(72) Inventors: Kazushige Akita, Nagaokakyo (JP); Yusuke Inaba, Nagaokakyo (JP)

(73) Assignee: Mitsubishi Logisnext Co., Ltd., Nagaokakyo (JP)

( * ) Notice: Subject to any disclaimer, the term of this patent is extended or adjusted under 35 U.S.C. 154(b) by 382 days.

(21) Appl. No.: 17/433,018

(22) PCT Filed: Nov. 20, 2019

(86) PCT No.: PCT/JP2019/045485
§ 371 (c)(1),
(2) Date: Aug. 23, 2021

(87) PCT Pub. No.: WO2020/179146
PCT Pub. Date: Sep. 10, 2020

(65) Prior Publication Data

US 2022/0153564 A1 May 19, 2022

(30) Foreign Application Priority Data

Mar. 1, 2019 (JP) ................................ 2019-037563

(51) Int. Cl.
*B66F 9/075* (2006.01)

(52) U.S. Cl.
CPC ........ *B66F 9/0759* (2013.01); *B66F 9/07545* (2013.01)

(58) Field of Classification Search
CPC .......................... B66F 9/0759; B66F 9/07545
See application file for complete search history.

(56) References Cited

U.S. PATENT DOCUMENTS 4,126,202 A * 11/1978 Hern ..................... B62D 65/04 180/90
4,987,522 A * 1/1991 Miyano .............. B66F 9/07545 296/213
5,333,701 A * 8/1994 Izumi ................. B66F 9/07545 180/90
5,573,273 A * 11/1996 Ito ......................... B60K 37/00 280/775

(Continued)

FOREIGN PATENT DOCUMENTS

JP H01134525 U1 9/1989
JP H07-013555 U 3/1995

(Continued)

*Primary Examiner* — Toan C To
(74) *Attorney, Agent, or Firm* — Hodgson Russ LLP

(57) ABSTRACT

Provided is a cargo-handling vehicle allowing a reduction in production cost. A forklift, which is a cargo-handling vehicle, includes a driver's seat in which an operator sits, a front guard 51 provided in front of the driver's seat, a control system 20 provided between the driver's seat and the front guard 51, and a front cover 40 attached to the front guard 51. The front cover 40 includes a center cover 41 concealing a base portion of the control system 20, and a side cover 42 not concealing the base portion of the control system 20, and the side cover 42 is provided to the right or left, or both, of the center cover 41 and has a top positioned lower than a top of the center cover 41.

5 Claims, 8 Drawing Sheets

(56) References Cited

U.S. PATENT DOCUMENTS 6,189,636 B1 * 2/2001 Kikukawa ........... H01M 50/271
180/68.5

FOREIGN PATENT DOCUMENTS

| | | | |
|---|---|---|---|
| JP | H09-025097 | A | 1/1997 |
| JP | 2003-220875 | A | 8/2003 |
| KR | 1020040051998 | B1 | 6/2004 |

* cited by examiner (A)

(B)

(A)

(B)

(A)

(B)

(A)

(B)

CARGO-HANDLING VEHICLE

TECHNICAL FIELD

The present invention relates to a cargo-handling vehicle including a front cover.

BACKGROUND ART

In general, a cargo-handling vehicle such as a forklift includes a driver's seat in which the operator sits, a front guard (dashboard) provided in front of the driver's seat, and a control system provided between the driver's seat and the front guard (see, for example, Patent Document 1). Moreover, the front guard has a front cover (dashboard cover) attached thereto so as to conceal a base portion, which is a part of the control system.

PRIOR ART DOCUMENT

Patent Document

Patent Document 1: Japanese Laid-Open Patent Publication No. H9-25097

DISCLOSURE OF THE INVENTION

Problems to be Solved by the Invention

Incidentally, front covers are sized according to respective models of cargo-handling vehicles. Therefore, when the configuration of the control system varies between a plurality of models of cargo-handling vehicles, or when the cargo-handling vehicles have different sizes, the front cover is required to be designed for each model, resulting in an increase in cargo-handling vehicle production cost.

The present invention has been accomplished in light of the above circumstances, and a problem thereof is to provide a cargo-handling vehicle allowing a reduction in production cost.

Solution to the Problems

To solve the above problem, a cargo-handling vehicle recited in claim 1 includes a driver's seat in which an operator sits, a front guard provided in front of the driver's seat, a control system provided between the driver's seat and the front guard, and a front cover attached to the front guard, the front cover includes a center cover and a side cover, the center cover concealing a base portion of the control system, the side cover not concealing the base portion of the control system, and the side cover is provided to the right or left, or both, of the center cover such that the side cover has a top positioned lower than a top of the center cover.

In the cargo-handling vehicle recited in claim 2 based on claim 1, the side cover and the center cover are adjacent to each other with a step between the top of the side cover and the top of the center cover in a top-bottom direction.

In the cargo-handling vehicle recited in claim 3 based on claim 2, the center cover has a right or left end portion situated above the side cover.

In the cargo-handling vehicle recited in claim 4 based on any one of claims 1 through 3, the side cover includes a right side cover provided to the right of the center cover and a left side cover provided to the left of the center cover.

The cargo-handling vehicle recited in claim 5 based on claim 4 further includes an overhead guard provided above the driver's seat, and pillars supporting the overhead guard, the pillars are right and left pillars provided to the right and left, respectively, of the front guard, the right side cover is provided between the center cover and the right pillar, and the left side cover is provided between the center cover and the left pillar.

The cargo-handling vehicle recited in claim 6 based on claim 4 or 5 further includes tilt cylinders provided in front of the driver's seat, the tilt cylinders are right and left cylinders situated diagonally to the front right and front left, respectively, of the driver's seat, the right side cover conceals at least a portion of the right cylinder, and the left side cover conceals at least a portion of the left cylinder.

The cargo-handling vehicle recited in claim 7 based on any one of claims 1 through 6 further includes a foot protection bar fixed to the front guard, the foot protection bar has an exposed portion not concealed by the center cover concealing a portion of the foot protection bar, and the exposed portion of the foot protection bar is situated at the same height as the center cover and above the side cover.

Effect of the Invention

The present invention renders it possible to provide a cargo-handling vehicle allowing a reduction in production cost and also increasing the operator's forward field of view from the driver's seat.

MODES FOR CARRYING OUT THE INVENTION

Embodiment 1

Figure 1:
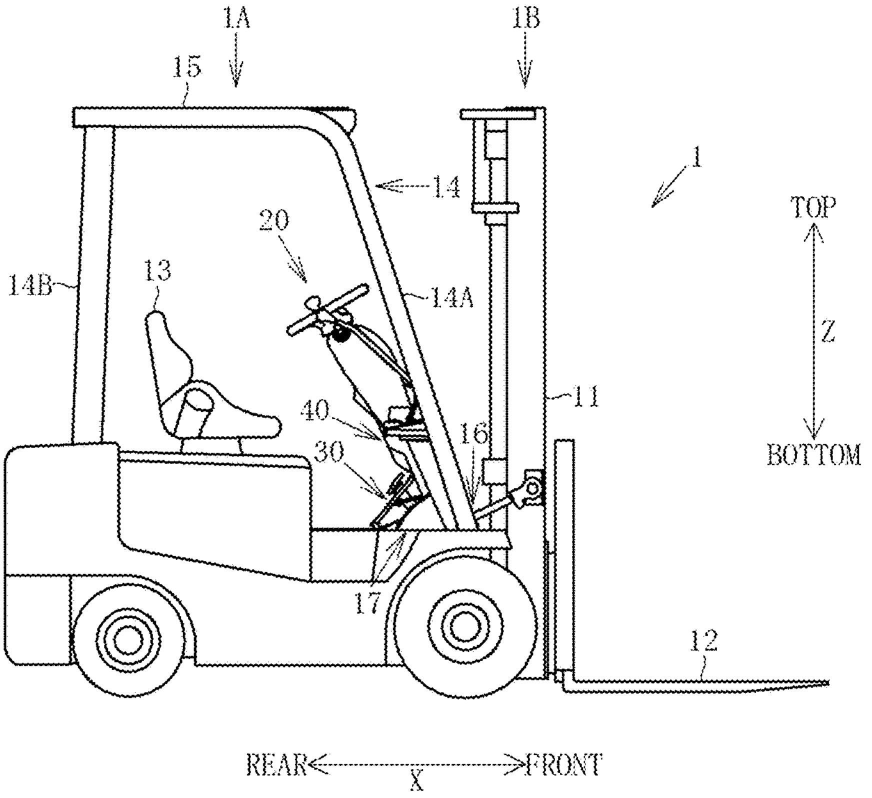
FIGS. 1(A) and 1(B) are side views illustrating a schematic configuration of a cargo-handling vehicle according to an embodiment of the present invention.
Figure 1:
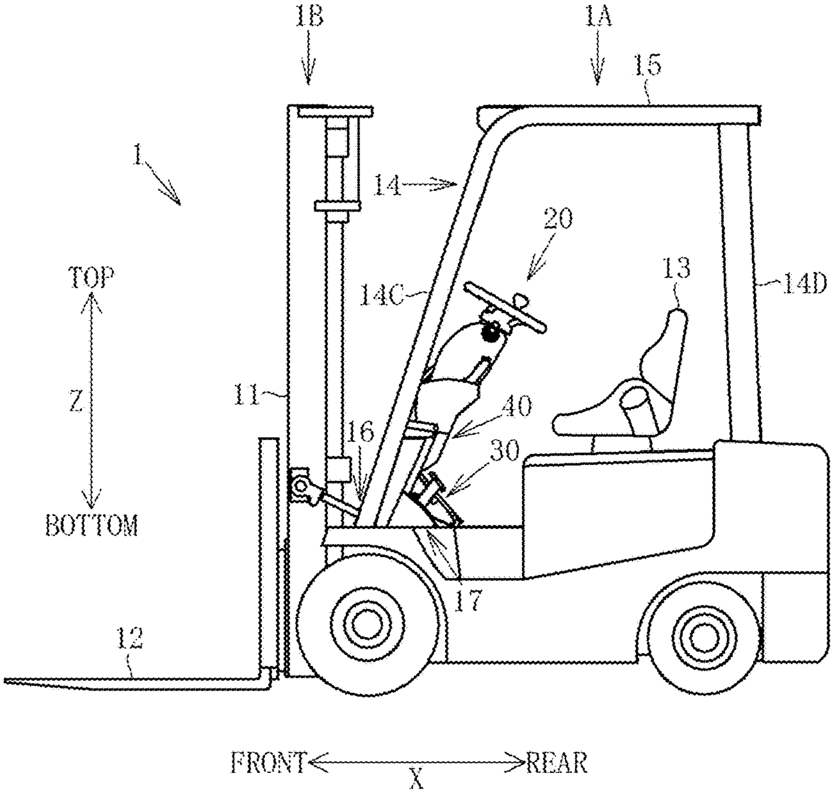

A forklift 1, which is a cargo-handling vehicle according to an embodiment of the present invention, will be described with reference to FIGS. 1 to 5. Note that in the figures, front-rear, left-right, and top-bottom directions X, Y, and Z are linear directions perpendicular to one another.

FIG. 1(A) illustrates a schematic configuration of the forklift 1 as viewed from right, and FIG. 1(B) illustrates the schematic configuration of the forklift 1 as viewed from left.

As shown in FIGS. 1(A) and 1(B), the forklift 1 includes a vehicle body 1A, which is a travel body, and a cargo handling device 1B provided in front of the vehicle body 1A. The cargo handling device 1B includes a mast 11 capable of extending and contracting in the top-bottom direction Z and forks 12 capable of moving up and down along the mast 11.

The forklift 1 includes the following components provided on the vehicle body 1A: a driver's seat 13; pillars 14; an overhead guard 15; tilt cylinders 16; cylinder covers 17; a control system 20; a foot-operated control system 30; and a front cover 40.

The driver's seat 13 is provided such that the operator (not shown) who controls the forklift 1 sits facing forward, and the operator in the driver's seat 13 operates the control system 20 and the foot-operated control system 30.

The pillars 14 are right pillars 14A and 14B and left pillars 14C and 14D. The right pillar 14A and the left pillar 14C are provided to the right and left, respectively, of a front guard 51 to be described later (see FIG. 2).

The overhead guard 15 is provided above the driver's seat 13 in order to protect the operator. The overhead guard 15 is connected to a top end of each of the right and left pillars 14A, 14B, 14C, and 14D and thereby supported by the pillars 14.

The tilt cylinders 16, the cylinder covers 17, the control system 20, the foot-operated control system 30, and the front cover 40 are provided in front of the driver's seat 13. The configurations of the tilt cylinder 16, the control system 20, and the foot-operated control system 30 will be described in detail with reference to FIG. 2, and the configurations of the cylinder cover 17 and the front cover 40 will be described in detail with reference to FIGS. 3 to 5.

Figure 2:
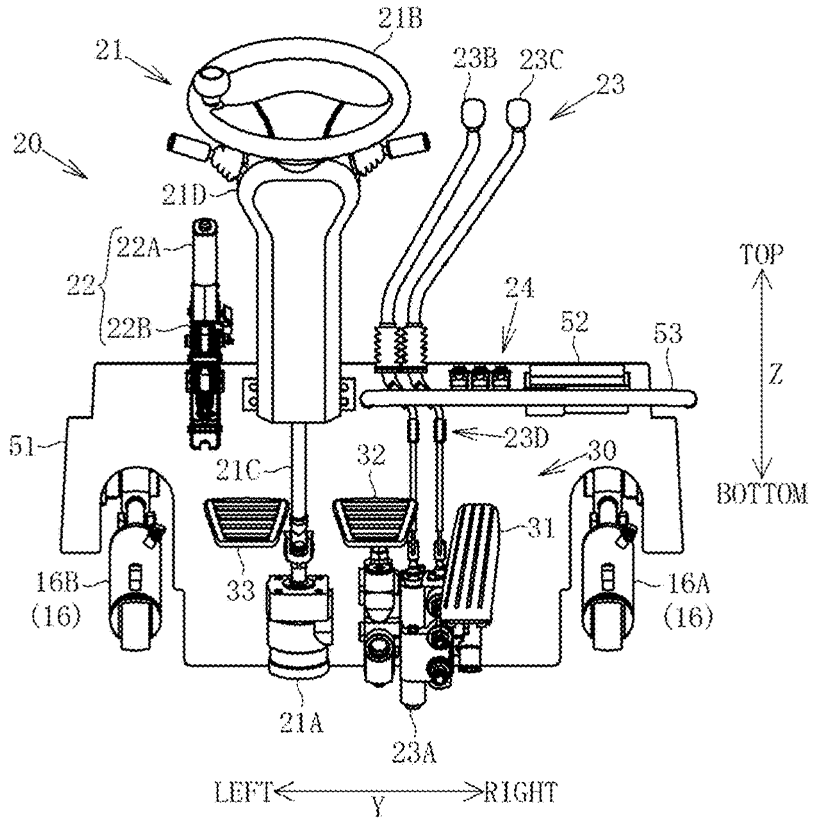
FIGS. 2(A) and 2(B) are schematic configuration diagrams illustrating components provided in front of a driver's seat in the cargo-handling vehicle according to the embodiment.
Figure 2:
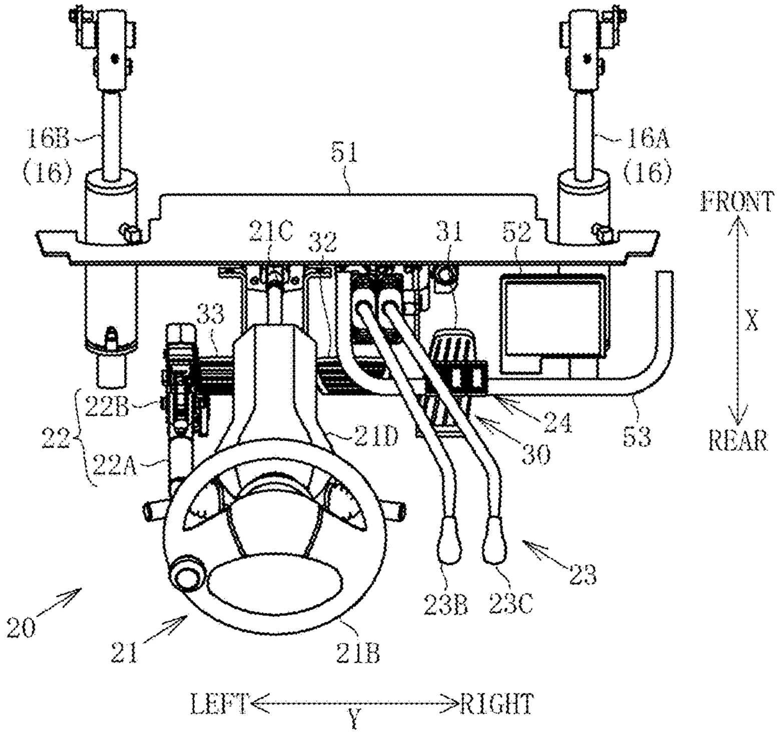

FIG. 2 provides views illustrating components provided in front of the driver's seat 13. In FIG. 2, the pillars 14A and 14C, the cylinder covers 17, the front cover 40, the cargo handling device 1B, etc., are not shown.

As shown in FIGS. 2(A) and 2(B), the forklift 1 further includes the following components provided on the vehicle body 1A: a front guard 51; a display device 52; and a foot protection bar 53.

The tilt cylinders 16 are right and left cylinders 16A and 16B situated diagonally to the front right and front left, respectively, of the driver's seat 13. The tilt cylinders 16 are provided so as to extend through the front guard 51 in the front-rear direction X; each of the cylinders 16A and 16B is supported at a bottom end, which is one of two ends of the cylinder, so as to be pivotable about a horizontal axis extending in the left-right direction Y, and the cylinder is also connected at a top end, i.e., the other end, to the mast 11 of the cargo handling device 1B.

The control system 20 and the foot-operated control system 30 are provided between the driver's seat 13 and the front guard 51. In the present embodiment, the control system 20 includes a steering control device 21, a parking brake control device 22, a cargo handling control device 23, and a switching device 24.

The steering control device 21 includes a valve device 21A (see FIG. 2(A)), a circular steering wheel 21B, a shaft 21C connecting the valve device 21A and the steering wheel 21B, and a column cover 21D concealing the shaft 21C. The valve device 21A supplies a hydraulic chamber in a steering cylinder (not shown) with steering hydraulic oil from an oil pump (not shown) in response to rotation of the shaft 21C. The column cover 21D is provided so as to extend through a center cover 41 to be described later (see FIG. 3) in the top-bottom direction Z, and the steering wheel 21B is provided above the center cover 41.

The parking brake control device 22 is a parking brake lever including a grip 22A and a link mechanism 22B, which transfers operating motion of the grip 22A to a parking brake device (not shown). By moving the grip 22A, the parking brake device starts or stops braking the vehicle body 1A.

The cargo handling control device 23 includes a valve device 23A (see FIG. 2(A)), a lift lever 23B, a tilt lever 23C, and a link mechanism 23D (see FIG. 2(A)) connecting the valve device 23A and the levers 23B and 23C. The valve device 23A supplies a hydraulic chamber in a cargo handling cylinder (not shown) with hydraulic oil from the oil pump (not shown) in an amount corresponding to the amount of motion of each of the levers 23B and 23C. Specifically, when the lift lever 23B is moved, the valve device 23A supplies hydraulic oil to a hydraulic chamber in a lift cylinder (not shown), and when the tilt lever 23C is moved, the valve device 23A supplies hydraulic oil to hydraulic chambers in the tilt cylinders 16. Each of the levers 23B and 23C is provided so as to extend upward above the center cover 41 to be described later.

The switching device 24 includes a plurality of rocker switches provided on the center cover 41 to be described later. By operating the switching device 24, various functions available to the forklift 1 are enabled or disabled.

Furthermore, in the present embodiment, the foot-operated control system 30 includes an accelerator pedal 31, a brake pedal 32, and an inching pedal 33. The pedals 31 to 33 are provided below the foot protection bar 53 so as to be situated on the rear side relative to the center cover 41 to be described later. Note that the figures do not show any components that support the pedals 31 to 33.

The pedals 31 to 33 are spaced apart from one another and arranged from right to left in the following order: the accelerator pedal 31, the brake pedal 32, and the inching pedal 33. The travel speed of the vehicle body 1A changes depending on the amount of depression of the accelerator pedal 31, the operation of a brake device (not shown) with which to brake the vehicle body 1A is controlled depending on the amount of depression of the brake pedal 32, and the operation of a clutch (not shown) is controlled depending on the amount of depression of the inching pedal 33. Moreover, the inching pedal 33 is connected to the brake pedal 32 by a link mechanism (not shown), and the brake device (not shown) is configured to be activated once the amount of depression of the inching pedal 33 reaches or exceeds a predetermined value.

The front guard 51 is a protective plate provided in the form of a cowl fixed at the front end of the vehicle body 1A in front of the driver's seat 13 so as to protect the operator. The front guard 51 is situated between the right pillar 14A and the left pillar 14C.

The display device 52 is, for example, a liquid crystal display provided on the center cover 41 to be described later. The display device 52 presents the operator with travel data such as travel speed and travel time, the remaining amount of fuel or battery power, etc.

The foot protection bar 53 extends across the accelerator pedal 31 in the left-right direction Y when viewed from above, and is fixed to the front guard 51. In the present embodiment, the foot protection bar 53 is connected at a right end, which is one end of the bar, to the right pillar 14A (see FIG. 1) and at a left end, i.e., the other end, to the front guard 51.

FIG. 3(A) is a view of the cylinder covers 17 and the front cover 40 as seen diagonally from rear, and FIG. 3(B) shows components in FIG. 3(A) in a disassembled state.

Figure 3:
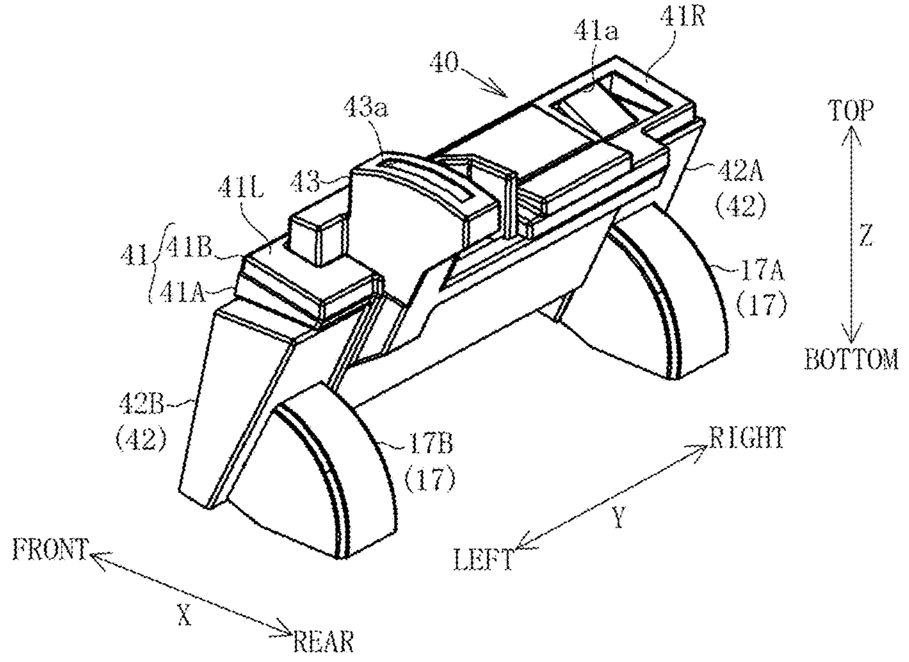
FIGS. 3(A) and 3(B) are oblique views of a front cover and other components according to the embodiment.
Figure 3:
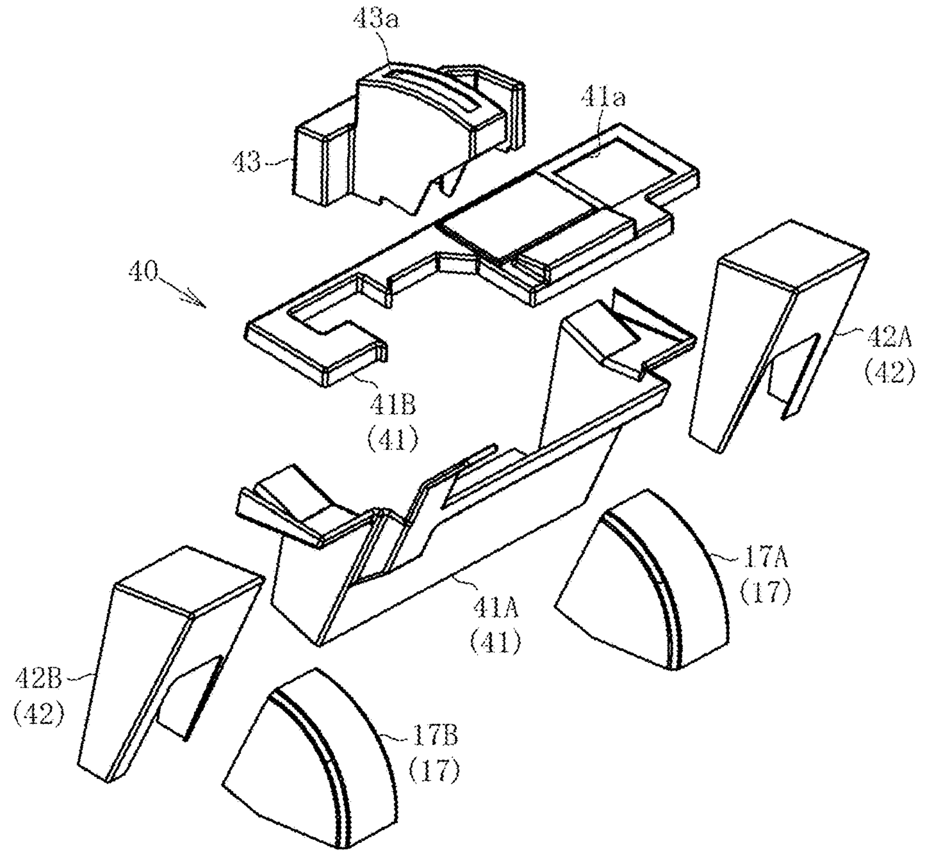

As shown in FIG. 3, the cylinder covers 17 are right and left cylinder covers 17A and 17B spaced apart in the left-right direction Y. To prevent the cylinder covers 17 from being broken as a result of being stepped on by the operator, the cylinder covers 17 are preferably formed of a metal material having a higher mechanical strength than a resin material of which the front cover 40 is formed.

The front cover 40 includes a center cover 41, side covers 42 provided to the right and left of the center cover 41, and a lever cover 43. The covers 41, 42, and 43 are preferably formed of a resin material.

The center cover 41 consists of a lower center cover 41A adjacent to the side covers 42 and an upper center cover 41B provided on top of the lower center cover 41A. The center cover 41 is attached to the front guard 51 with the result that an accommodation space (referred to below as a "space S") for partially accommodating the control system 20, the foot-operated control system 30, etc., is created between the center cover 41 and the front guard 51. The center cover 41 has right and left end portions 41R and 41L to be situated above the side covers (see FIG. 3(A)).

The lower center cover 41A and the upper center cover 41B have the same dimension in the left-right direction Y and are opposed to each other in the top-bottom direction Z. The lower center cover 41A and the upper center cover 41B are configured to create an opening in which to dispose the lever cover 43 and the column cover 21D of the steering control device 21. Moreover, the upper center cover 41B has an opening 41*a* provided for disposing the display device 52. Similarly, the upper center cover 41B has an opening (not shown) provided for disposing the levers 23B and 23C of the cargo handling control device 23 and another opening (not shown) provided for disposing the rocker switches of the switching device 24.

The side covers 42 are right and left side covers 42A and 42B provided to the right and left, respectively, of the center cover 41. Each side cover 42 is adjacent to the center cover 41 with a step between the top of the side cover 42 and the top of the center cover 41 in the top-bottom direction Z.

The lever cover 43 is configured to be fitted in the upper center cover 41B. The lever cover 43 has a slit 43*a* provided for exposing the grip 22A of the parking brake control device 22 above the lever cover 43.

Figure 4:
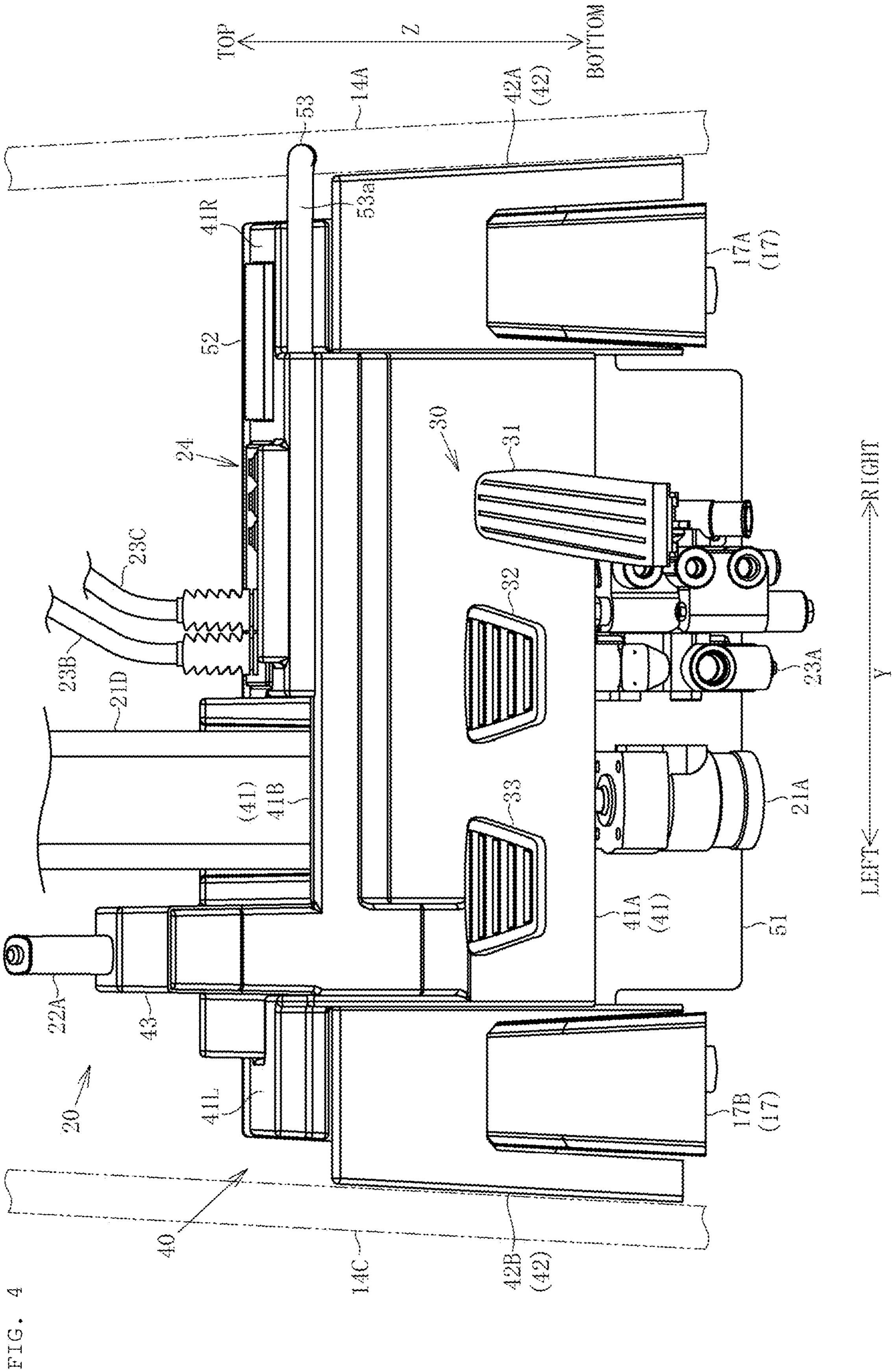
FIG. 4 is a schematic configuration diagram illustrating the front cover according to the embodiment attached to a front guard.
Figure 5:
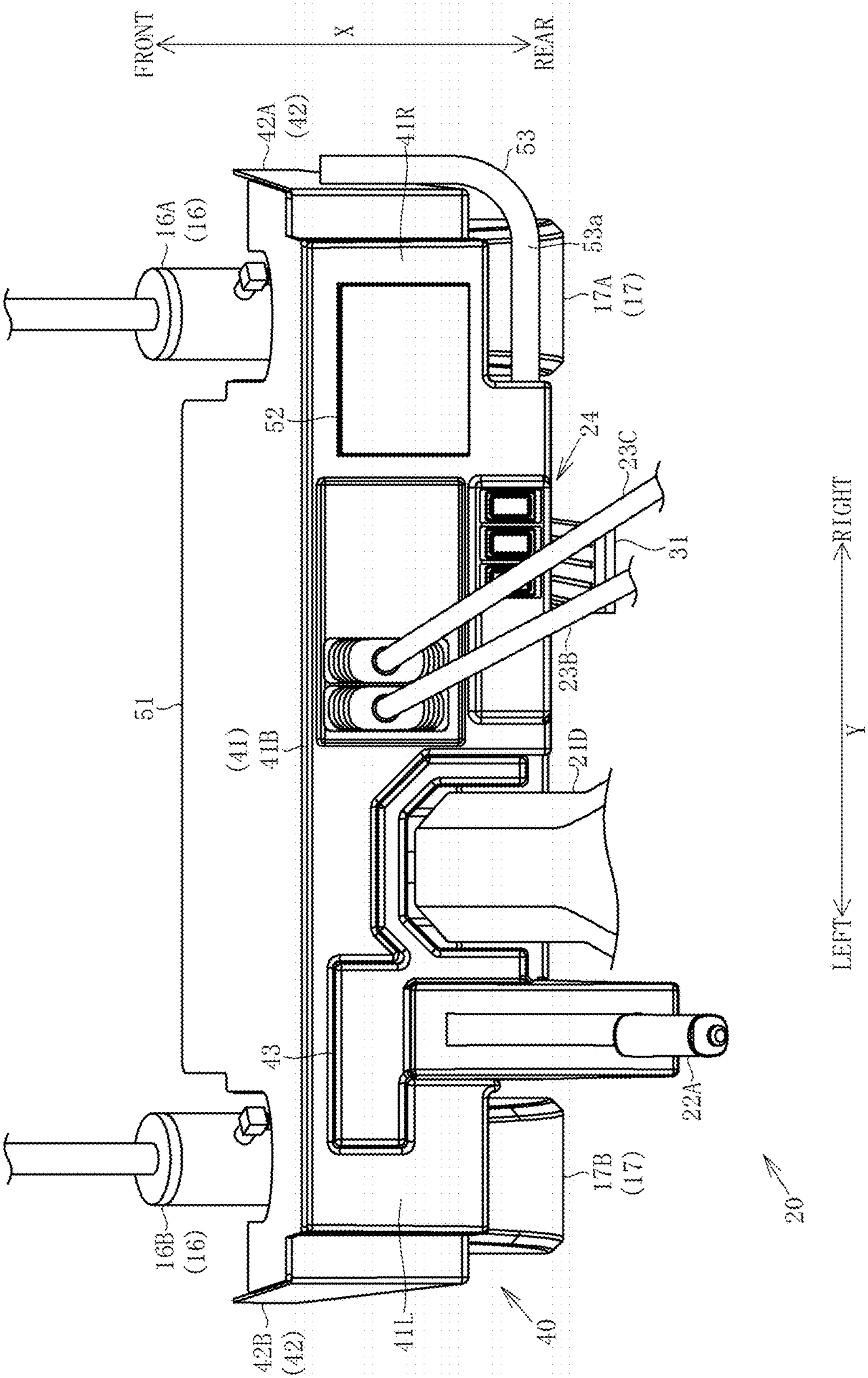
FIG. 5 is a schematic configuration diagram illustrating the front cover according to the embodiment attached to the front guard.

FIGS. 4 and 5 are views illustrating the front cover 40 and other components attached to the front guard 51, FIG. 4 being a view of the front cover 40 and the other components as seen from rear, and FIG. 5 being a view of the front cover 40 and the other components as seen from above.

As shown in FIG. 4, the center cover 41 conceals a base portion (referred to below as a "base portion B"), which constitutes a part of the control system 20. In the present embodiment, the base portion B concealed by the center cover 41 includes a lower end portion (not concealed by the column cover 21D) of the shaft 21C of the steering control device 21 and the link mechanism 23D of the cargo handling control device 23. Note that in the present embodiment, the valve devices 21A and 23A are concealed not by the center cover 41 but by a floor panel (not shown) on the rear side.

The right side cover 42A is provided between the center cover 41 and the right pillar 14A such that the right side cover 42A, along with the right cylinder cover 17A, conceals a rear end portion of the right cylinder 16A without concealing the base portion B. Moreover, the left side cover 42B is provided between the center cover 41 and the left pillar 14C such that the left side cover 42B, along with the left cylinder cover 17B, conceals a rear end portion of the left cylinder 16B without concealing the base portion B.

Furthermore, since the right end portion 41R of the center cover 41 is disposed above the right side cover 42A, the right side cover 42A is adjacent to the center cover 41 with a step between the top of the right side cover 42A and the top of the center cover 41 in the top-bottom direction Z. In this manner, the top of the right side cover 42A is positioned lower than the top of the center cover 41. Similarly, since the left end portion 41L of the center cover 41 is disposed above the left side cover 42B, the left side cover 42B is adjacent to the center cover 41 with a step between the top of the left side cover 42B and the top of the center cover 41 in the top-bottom direction Z. In this manner, the top of the left side cover 42B is positioned lower than the top of the center cover 41.

The center cover 41 conceals a portion of the foot protection bar 53, as shown in FIG. 5, so that the foot protection bar 53 has an exposed portion 53*a* not concealed by the center cover 41. The exposed portion 53*a* of the foot protection bar 53 is situated at the same height as the center cover 41 and above the side cover 42. In the present embodiment, the exposed portion 53*a* of the foot protection bar 53 extends rightward from the center cover 41 and then curves forward.

Embodiment 2

Next, a forklift which is a cargo-handling vehicle according to another embodiment of the present invention (referred to below as a "forklift 1'") will be described with reference to FIGS. 6 to 8. Note that components similar to those in Embodiment 1 will not be elaborated upon.

The forklift 1' in the present embodiment is a large-sized cargo-handling vehicle configured similarly to the forklift 1 in Embodiment 1 but having a higher engine displacement than the forklift 1. More specifically, the space between the right and left pillars 14A and 14C included in the pillars 14 is greater in the present embodiment (see FIG. 7) than in Embodiment 1, and the dimension of the front guard 51 in the left-right direction Y is greater in the present embodiment (see FIG. 7) than in Embodiment 1. Moreover, each of the cylinders 16A and 16B is thicker in the present embodiment (see FIG. 8) than in Embodiment 1.

FIG. 6(A) is a view of cylinder covers 17' and a front cover 40' included in the forklift 1' as seen diagonally from rear, and FIG. 6(B) shows components in FIG. 6(A) in a disassembled state.

Figure 6:
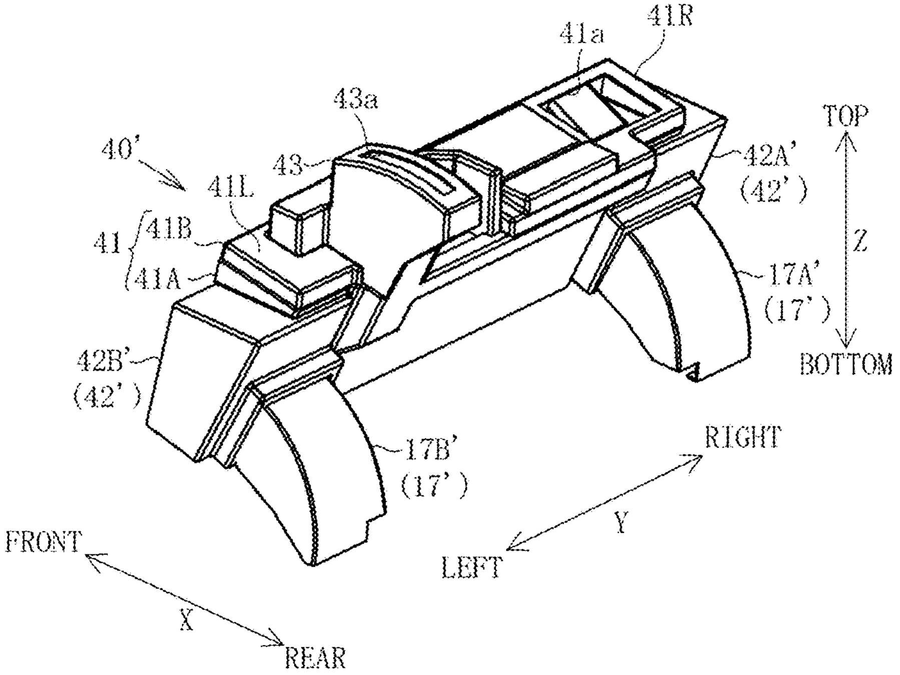
FIGS. 6(A) and 6(B) are oblique views of a front cover and other components according to another embodiment.
Figure 6:
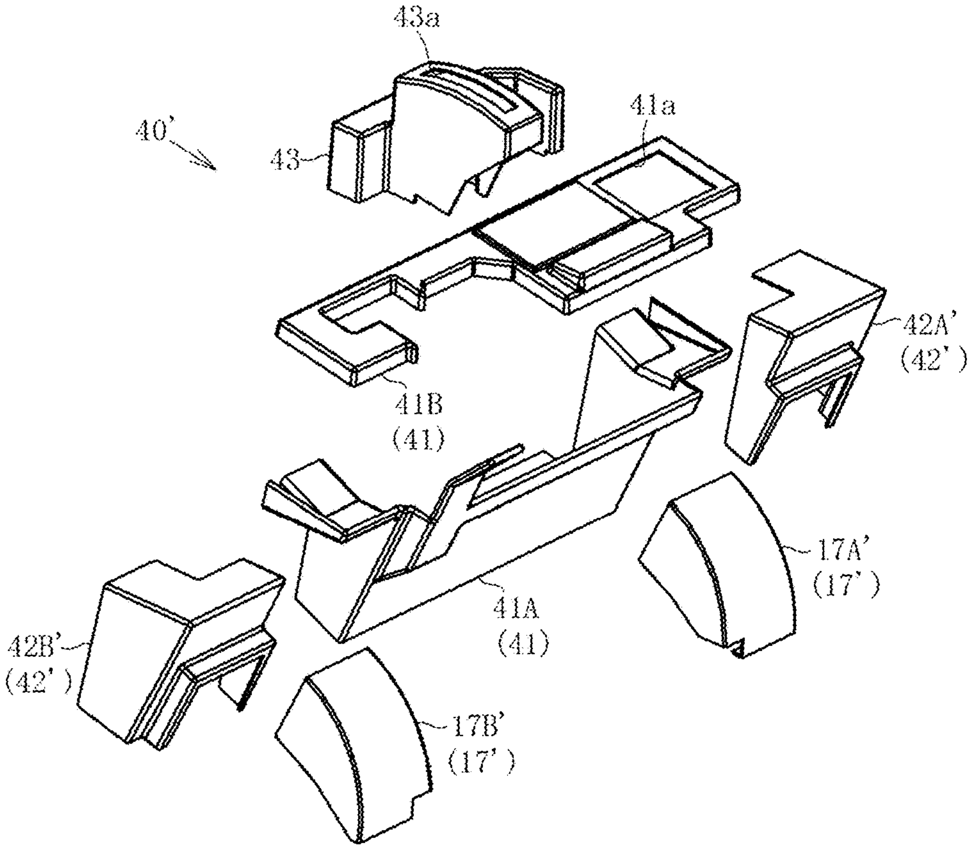

As shown in FIG. 6, the cylinder covers 17' are right and left cylinder covers 17A' and 17B' spaced apart in the left-right direction Y. The right cylinder cover 17A' is longer in the left-right direction Y than the right cylinder cover 17A in Embodiment 1, and similarly, the left cylinder cover 17B' is longer in the left-right direction Y than the left cylinder cover 17B in Embodiment 1.

The front cover 40' includes the same center cover 41 as in Embodiment 1, side covers 42' provided to the right and left of the center cover 41, and the same lever cover 43 as in Embodiment 1. The side covers 42' are right and left side covers 42A' and 42B' provided to the right and left, respectively, of the center cover 41. Each side cover 42' is adjacent to the center cover 41 with a step between the top of the side cover 42' and the top of the center cover 41 in the top-bottom direction Z.

Figure 7:
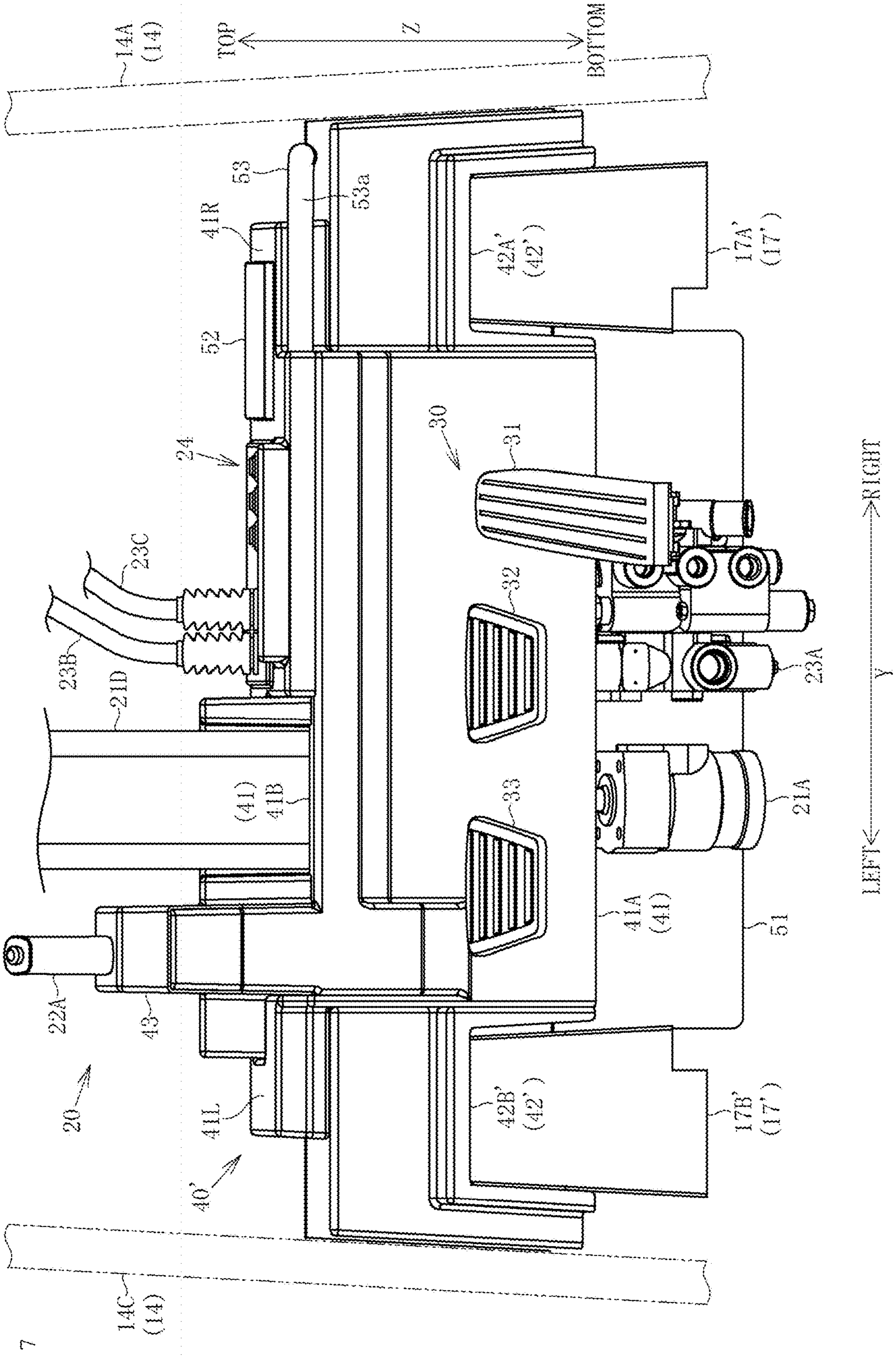
FIG. 7 is a schematic configuration diagram illustrating the front cover according to the embodiment attached to a front guard.
Figure 8:
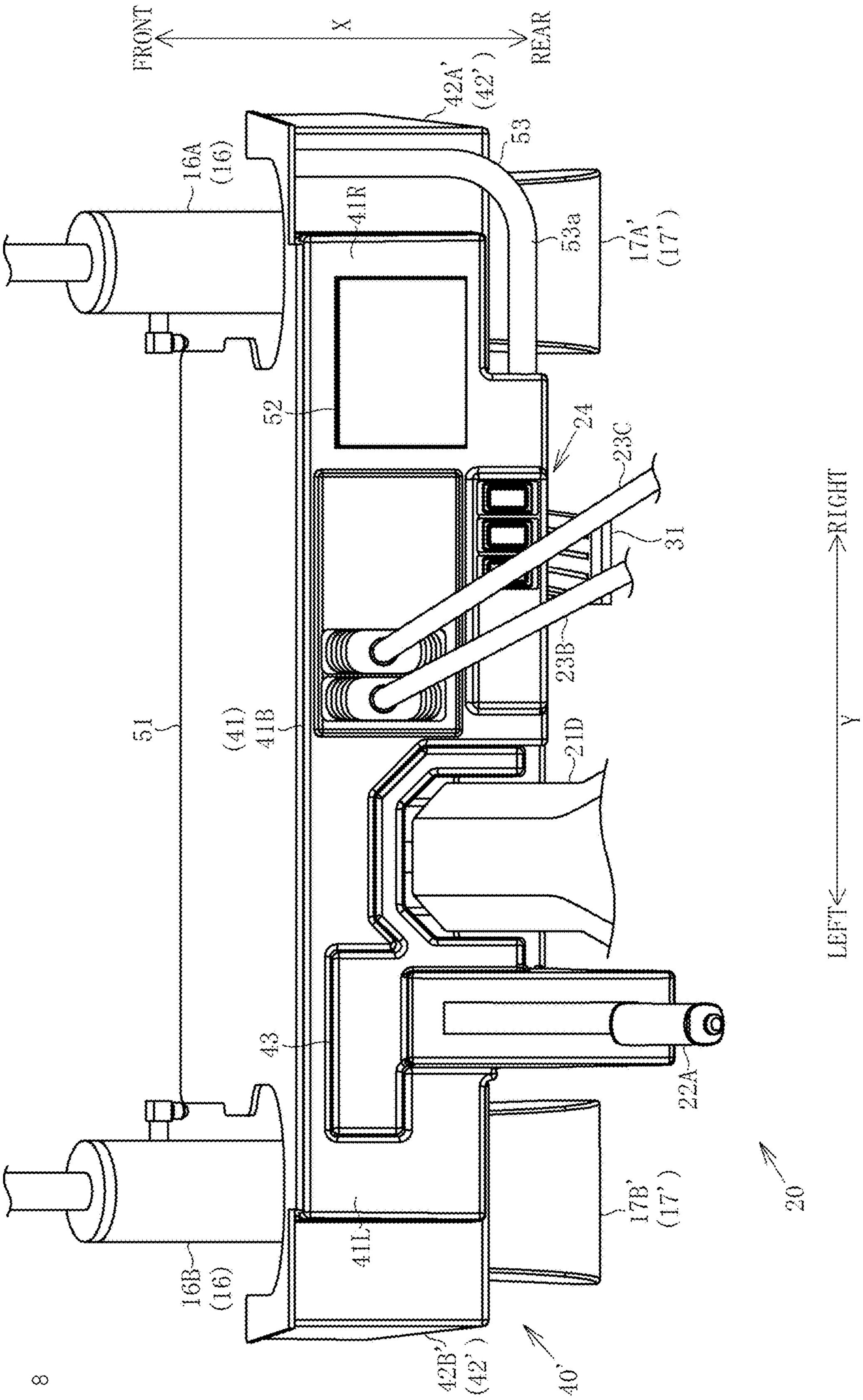
FIG. 8 is a schematic configuration diagram illustrating the front cover according to the embodiment attached to the front guard.

FIGS. 7 and 8 are views illustrating the front cover 40' and other components attached to the front guard 51, FIG. 7 being a view of the front cover 40' and the other components as seen from rear, and FIG. 8 being a view of the front cover 40' and the other components as seen from above.

As shown in FIG. 7, the right side cover 42A' is provided between the center cover 41 and the right pillar 14A such that the right side cover 42A', along with the right cylinder cover 17A', conceals a rear end portion of the right cylinder 16A without concealing the base portion B. Moreover, the left side cover 42B' is provided between the center cover 41 and the left pillar 14C such that the left side cover 42B', along with the left cylinder cover 17B', conceals a rear end portion of the left cylinder 16B without concealing the base portion B.

Furthermore, since the right end portion 41R of the center cover 41 is disposed above the right side cover 42A', the right side cover 42A' is adjacent to the center cover 41 with a step between the top of the right side cover 42A' and the top of the center cover 41 in the top-bottom direction Z. Similarly, since the left end portion 41L of the center cover 41 is disposed above the left side cover 42B', the left side cover 42B' is adjacent to the center cover 41 with a step between the top of the left side cover 42B' and the top of the center cover 41 in the top-bottom direction Z.

In the present embodiment, as shown in FIG. 8, the exposed portion 53*a* of the foot protection bar 53 extends rightward from the center cover 41, curves forward, and is connected to the front guard 51.

As described above, the forklift 1 in Embodiment 1 and the forklift 1' in Embodiment 2 differ in the space between the right and left pillars 14A and 14C and the diameter of each of the cylinders 16A and 16B, but commonly use the control system 20. Accordingly, the center cover 41, which is designed for the control system 20, is commonly used as well.

The present invention renders it possible to achieve the following effects:

(1) The front covers 40 and 40' each includes the center cover 41, which conceals the base portion B of the control system 20, and the side covers 42 or 42', which do not conceal the base portion B of the control system 20. Accordingly, the center cover 41 can be used in common between the forklifts 1 and 1', which are different models, and the side covers 42 and 42' can be designed and employed for the respective models, with the result that unlike in configurations with the center cover integrated with the side covers, these models can share a part (the center cover 41) of the front cover 40 or 40', thereby reducing the cost of producing the forklifts 1 and 1'. Moreover, the top of the side covers 42 and 42' is positioned lower than the top of the center cover 41. Therefore, when compared to configurations with the top of the side covers situated at the same height as the top of the center cover, it is possible to increase the operator's forward field of view from the driver's seats 13 in the forklifts 1 and 1'.

(2) Providing the steps between the top of the side covers 42 or 42' and the top of the center cover 41 in the top-bottom direction Z renders it possible to further increase the operator's forward field of view from the forklift 1 or 1'.

(3) The right end portion 41R of the center cover 41, which is disposed above the side cover 42 or 42', renders it possible that the gap between the center cover 41 and the right side cover 42A or 42A' is made less noticeable from above. Similarly, the left end portion 41L of the center cover 41, which is disposed above the side cover 42 or 42', renders it possible that the gap between the center cover 41 and the left side cover 42B or 42B' is made less noticeable from above.

(4) The right side covers 42A and 42A' designed for the respective models can fill the space between the center cover 41 and the right pillar 14A, and the left side covers 42B and 42B' designed for the respective models can fill the space between the center cover 41 and the left pillar 14C.

(5) The right side covers 42A and 42A' render it possible to make the rear end portion of the right cylinder 16A less noticeable. Similarly, the left side covers 42B and 42B' render it possible to make the rear end portion of the left cylinder 16B less noticeable.

(6) By attaching a base part of a highly versatile mounting system (not shown) to the exposed portion 53*a* of the foot protection bar 53, it is rendered possible for the foot protection bar 53 to support an information terminal, such as a tablet computer, a bottle holder, etc.

The present invention is not limited to the above embodiments, and the above configurations can be modified. For example, modifications as below can be carried out individually or in combination.

The configuration of the center cover 41 may be suitably modified. Specifically, for example, the center cover 41 may be integrally formed with the lever cover 43 so as to double as a lever cover.

The base portion B of the control system 20, which is concealed by the center cover 41, may be suitably modified in terms of configuration. Specifically, for example, the base portion B concealed by the center cover may be configured to include the valve devices 21A and 23A by changing the lower center cover 41A such that the bottom of the lower center cover 41A extends further downward than in the above embodiments.

The cargo handling control device 23 may include another lever (not shown; e.g., a reach lever) in addition to the lift lever 23B and the tilt lever 23C. That is, the configuration of the control system 20 may be suitably modified. Moreover, the center cover 41 may be provided with another device in addition to the control system 20 and the display device 52.

The side covers 42 do not have to be provided to both the right and left of the center cover 41. That is, the side cover 42 may be provided to the right or left, or both, of the center cover 41. Moreover, so long as the top of the side cover provided to either the right or left of the center cover 41 (e.g., the left side cover) is positioned lower than the top of the center cover, the top of the other side cover (e.g., the right side cover) does not have to be positioned lower than the top of the center cover.

The side covers 42 and 42' may have another function in addition to the function of hiding the tilt cylinders 16. For example, each of the side covers 42A, 42A', 42B, and 42B' may be provided with a pocket (not shown) for accommodating a drink bottle and/or documents, such that the side covers have the function of accommodating accessories.

DESCRIPTION OF THE REFERENCE CHARACTERS

1 forklift (cargo-handling vehicle)
1A vehicle body
1B cargo handling device
13 driver's seat
14 pillar
14A right pillar
14C left pillar
15 overhead guard
16 tilt cylinder
16A right cylinder
16B left cylinder
17 cylinder cover
17A right cylinder cover
17B left cylinder cover

20 control system
21 steering control system
22 parking brake control system
23 cargo handling control system
30 foot-operated control system
40, 40' front cover
41 center cover
41R right end portion
41L left end portion
42, 42' side cover
42A, 42A' right side cover
42B, 42B' left side cover
43 lever cover
51 front guard
53 foot protection bar
53*a* exposed portion

The invention claimed is:

1. A cargo-handling vehicle comprising:

a driver's seat in which an operator sits;

a front guard provided in front of the driver's seat;

a control system provided between the driver's seat and the front guard;

a front cover attached to the front guard; and tilt cylinders provided in front of the driver's seat, wherein, the front cover includes a center cover and a side cover, the center cover concealing a base portion of the control system, the side cover not concealing the base portion of the control system, the side cover is provided to the right and left of the center cover such that the side cover has a top positioned lower than a top of the center cover, the side cover includes a right side cover provided to the right of the center cover and a left side cover provided to the left of the center cover, the tilt cylinders are right and left cylinders situated diagonally to the front right and front left, respectively, of the driver's seat, the right side cover conceals at least a portion of the right cylinder, and the left side cover conceals at least a portion of the left cylinder.

2. The cargo-handling vehicle according to claim 1, wherein the side cover and the center cover are adjacent to each other with a step between the top of the side cover and the top of the center cover in a top-bottom direction.

3. The cargo-handling vehicle according to claim 2, wherein the center cover has a right or left end portion disposed above the side cover.

4. The cargo-handling vehicle according to claim 1, further comprising:

an overhead guard provided above the driver's seat; and pillars supporting the overhead guard, wherein, the pillars are right and left pillars provided to the right and left, respectively, of the front guard, the right side cover is provided between the center cover and the right pillar, and the left side cover is provided between the center cover and the left pillar.

5. A cargo-handling vehicle comprising:

a driver's seat in which an operator sits;

a front guard provided in front of the driver's seat;

a control system provided between the driver's seat and the front guard;

a front cover attached to the front guard; and a foot protection bar fixed to the front guard, wherein, the front cover includes a center cover and a side cover, the center cover concealing a base portion of the control system, the side cover not concealing the base portion of the control system, the side cover is provided to the right or left, or both, of the center cover such that the side cover has a top positioned lower than a top of the center cover, the foot protection bar has an exposed portion not concealed by the center cover concealing a portion of the foot protection bar, and the exposed portion of the foot protection bar is situated at the same height as the center cover and above the side cover.

* * * * *